United States Patent [19]
Bonvicini

[11] 3,826,426
[45] July 30, 1974

[54] MOTOR-DRIVEN SPRAYING MACHINE TO BE CARRIED ON THE WORKER'S BACK

[76] Inventor: Giacomo Bonvicini, Via Romana, 17, Poviglio, Italy 42028

[22] Filed: May 30, 1973

[21] Appl. No.: 365,226

[52] U.S. Cl............................. 239/127, 239/152
[51] Int. Cl............................................ B05b 9/08
[58] Field of Search ........... 239/152, 153, 154, 124, 239/127, 302

[56] References Cited
UNITED STATES PATENTS

| | | | |
|---|---|---|---|
| 2,958,155 | 11/1960 | Emmerich | 239/153 X |
| 3,421,697 | 1/1969 | Marks | 239/152 |
| 3,428,255 | 2/1969 | Ballu | 239/154 |
| 3,586,238 | 6/1971 | Schniever et al. | 239/153 |

FOREIGN PATENTS OR APPLICATIONS

| | | | |
|---|---|---|---|
| 837,369 | 6/1960 | Great Britain | 239/152 |
| 267,250 | 3/1968 | Austria | 239/152 |

*Primary Examiner*—Robert S. Ward, Jr.
*Assistant Examiner*—Michael Y. Mar
*Attorney, Agent, or Firm*—Staas, Halsey & Gable

[57] ABSTRACT

A knapsack motor-driven spraying machine for spraying liquids for agricultural purposes, for disinfestations of other treatments comprising a container for the liquid to be sprayed, provided with means for hanging the machine on the worker's back and including a pump for delivery the liquid under a predetermined pressure by means of an at least partially flexible delivery pipe ending with a handle including a nozzle controlled by a valve, provided to stop or reducing the liquid delivery, characterized by the fact that the pump is actuated by an internal combustion engine forming with said pump a compact unit carried on the outside of the rear wall of the container and each having self-carrying casing, on the side of the motor the motor pump unit being supported by fastening means including packing means and dampers to absorb the vibrations, while at the side where the pump is arranged its self-carrying casing is connected and supported by the container by two hollow connection members, one of which constitutes a portion of the suction pipe of the pump and the other is a portion of a recirculation pipe of the liquid, said two hollow connection members projecting into the inside of the container, where they are connected with pipes mounted into the container and which open near its bottom.

6 Claims, 3 Drawing Figures

MOTOR-DRIVEN SPRAYING MACHINE TO BE CARRIED ON THE WORKERS BACK

The present invention relates to a motor-driven spraying machine comprising a motor-pump associated with a container for the liquid to be sprayed and which is provided with means for hanging said machine to the worker's shoulders, as a knapsack.

Said motor-pump is designed (but not exclusively) to be used to spray liquids or liquid mixtures for agricultural purposes, but it can also be used for different purposes, as for instance, for distributing insecticide liquids or for evenly spraying liquids in general.

According to this invention provision has been made to employ a special, lightweight, compact motor pump unit so constructed as to be mounted at the outside of the liquid container in such a manner that all its operative members can be accessible and can never contact the liquid to be sprayed, with the exception of the inner suction and recirculation pipes connected to the pump so that a longer life can be assured to such a unit, since, as well known, the treated liquids are in general very corrosive and/or liable to produce foulings and/or deposits.

The motor pump unit of the invention has substantially few projecting parts and is so constructed as to be mounted on the rear wall of the container so that the worker is not hampered by it and he not only can freely actuate the spraying nozzle but also can go under the tree branches for spraying liquids also on the lowest portions of a tree.

It is another object of this invention to provide a pump so constructed that its pipe fittings are also designed to fasten the pump casing to the container, i.e., they are constituted of pipes which can be used either as liquid conduits and as carrying means for fixing the motor pump unit to said container body, thus eliminating the necessity to use other supporting means in order to accomplish such a specific task; therefore as a result thereof the weight of this unit is reduced because of the fact that the pump casing together with the motor casing perform a carrying function. Said carrying pipe fittings as well as other conventional fastening means which are provided on the side where the motor is located are associated with damping means provided to avoid the engine vibrations and the pump pulsations to be transmitted to the container and to the liquid contained therein.

It is well known that for such aforementioned purposes are commonly used spraying pumps which are manually actuated and mounted into the liquid container, which is hung as a knapsack on the worker's back.

Said types of pumps have several inconveniences and more in particular:

1. their maneuver is hard and their performance is uneven, since as the worker's hand stops to actuate the control lever or when his fatigue increases the liquid delivery stops or decreases;
2. it is known that in view of reducing the effort required by the worker a long control lever has to be provided for manually actuating the pump and thus for the lever movements a very broad space is required and as a result thereof it becomes very difficult to the worker to reach the zones under or between the branches of a tree;
3. the pumping members are always at least partially plunged into the liquid so that they are subjected to the etching of said liquid or they are housed in chambers arranged into the container which are accessible with difficulty and increase the volume of the container, making also very difficult to perform overhaul or repair operations.

This invention overcomes said inconveniences by the provision of a special motor-driven pump associated with a container so as to form a spraying machine to be hung on the worker's back and by which becomes very easy to spray the liquid, since the worker must only guide the nozzle supporting handle and closes or opens the delivery valve associated with said nozzle. Said spraying machine ensures an absolute continuity of its performance, because of the fact that the liquid delivery is continuous and said liquid has always a predetermined pressure.

According to the present invention are thus eliminated the encumbering control lever as well as the double connection means, which are provided in the conventionally manually driven spraying pump for allowing that said control lever may be mounted on the right or on the left side of the liquid container.

The accompanying drawings show, merely by way of example without limiting the invention, an embodiment of this latter.

Figure 1:
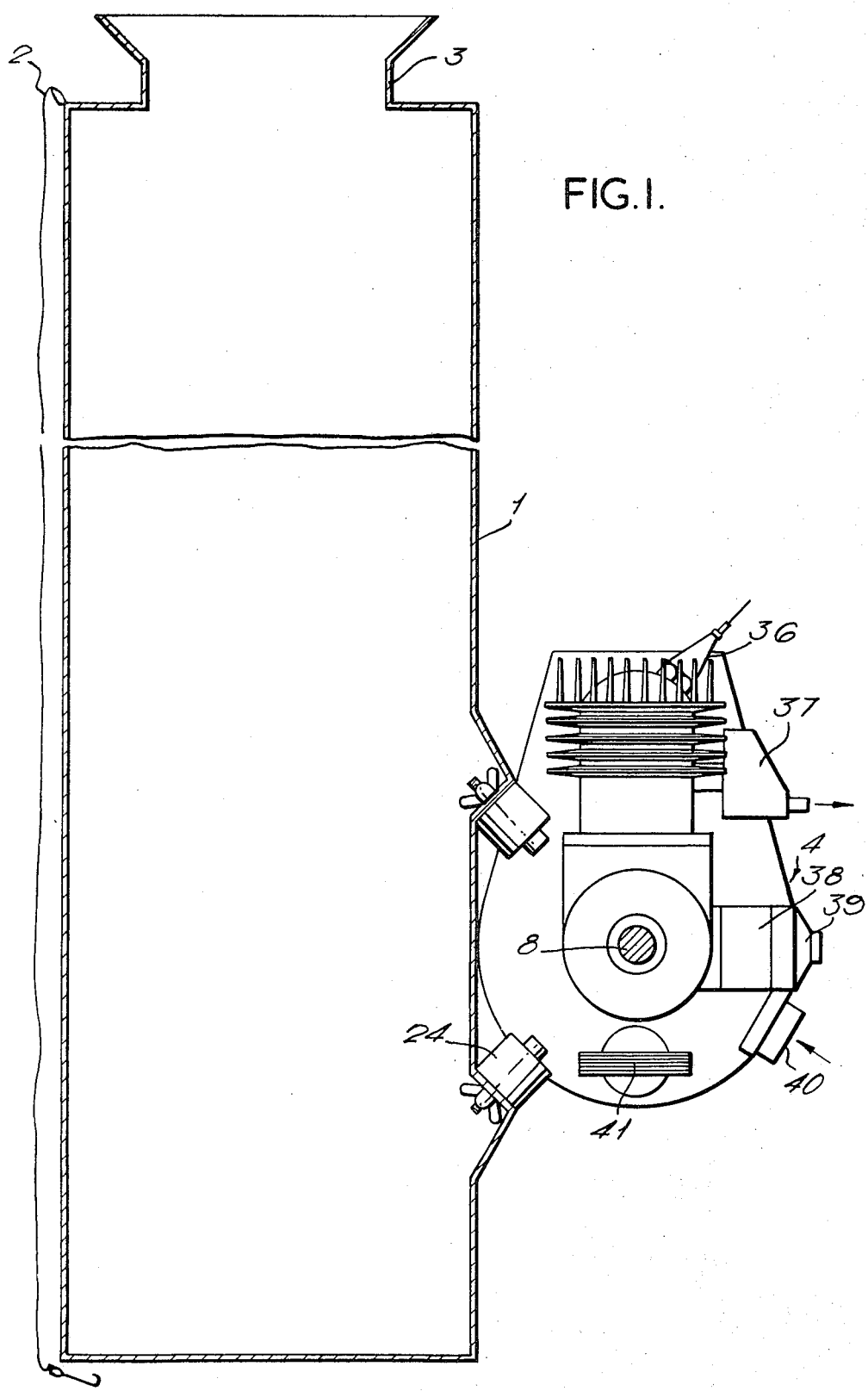
FIG. 1 is a side view of the knapsack spraying motor-pump, taken from the side where there is the engine, the container being shown in section.

The spraying machine of this invention comprises a container for the liquid to be sprayed, generally marked 1 and having a conventional shape, said container being provided with suspension bands 2 for hanging the machine on the worker's shoulders. The container 1 has a upper opening 3 closed by a removable cover, not shown in the drawings. The motor pump unit comprises an explosion single-cylinder engine generally marked 4 and a pump generally marked 5. Into the cylinder of the engine 4 reciprocates a piston 6 which through the connecting rod 7 drives a crankshaft 8, on one of its ends is mounted a ribbed flywheel-magneto 9, while at the opposite end said crankshaft 8 transmits the motion to a coaxial shaft 10 on which is mounted an excentric 10a driving a radial piston 11 having horizontal axis, to the head of which is connected a flexible, resiliently deformable diaphragm 12 defining together with the pump casing walls a chamber 13 of variable volume arranged at the rear part of the pump unit 5, into said chamber ending the suction conduit 14 coming out of the liquid container 1 and controlled by a check valve 15, said chamber being also put in communication with the delivery conduit 16 controlled by the check valve 17 and in which is provided a two-way connection comprising a pipe union 18 on which will be mounted the delivery pipe which comprises at least a flexible portion and which ends with a nozzle carrying handle (not shown in the drawings), while downstream of said two-way connection, the conduit 16 is connected with a pipe 16a where the liquid flow is controlled by a calibrated valve 19 which opens as the pressure of the liquid into the pipe 16a becomes higher than a predetermined value as a result of a partial or total closure of the valve controlling the liquid delivery through the said nozzle carried by the guiding handle, thus allowing the liquid to be returned into the container 1 through a pipe 20 connected to the pipe 16a. It has to be pointed out that such a vertical disposition of the delivery pipe union 18 enables the worker to carry the nozzle handle either with the right or with the left hand according to his conveniences. The outer surfaces of the end portions 16b and 14a of the pipes 16a and 14 are threaded so as to form externally threaded union members which are so shaped as to allow the pipes 16a and 14 to be connected respectively to the pipes 20 and 21 which are placed in the inside of the container 1, the pipe 21 ending with a filtering rose 21a. Further said union portions 16b and 14a are so dimensioned and shaped as to constitute carrying means for the motor pump unit on the pump side, by means of which said unit is fixed to the container body 1.

For such a purpose the portions 16b and 14a are provided with stop flanges 16c and 14b respectively, while on the threaded end portions 16b and 14a which project within the container 1 are screwed screw nuts 22 mounted from the inside of said container with the interposition of outer and inner washers 23a and 23b made of a material adapted to ensure a water-tight passage of said end portions through the container wall and to damper the vibrations transmitted by the units 4 and 5.

On the side, where the engine is placed the motor pump unit is fastened to the container 1 by conventional supporting means provided with dampers and generally marked 24.

Figure 2:
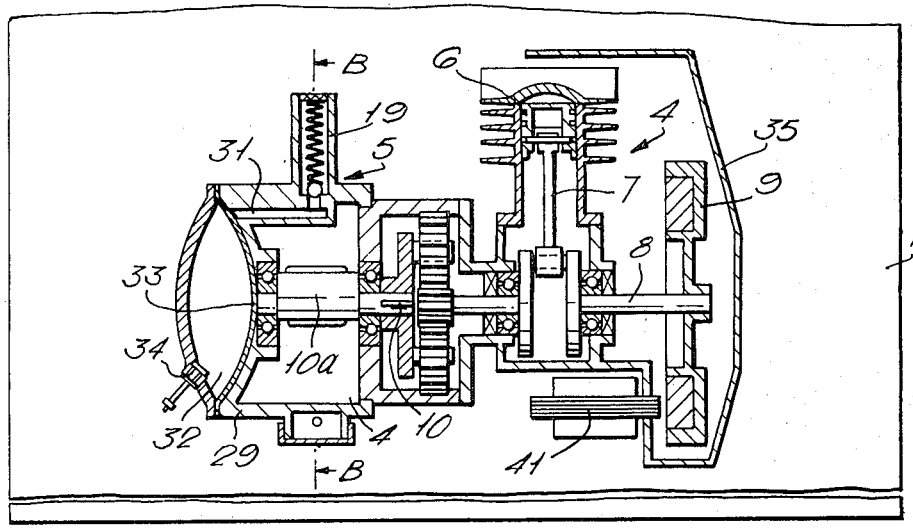
FIG. 2 is a partial rear view of the spraying machine showing the motor-pump unit in a vertical axial section, taken on the line A—A of FIG. 3.
Figure 3:
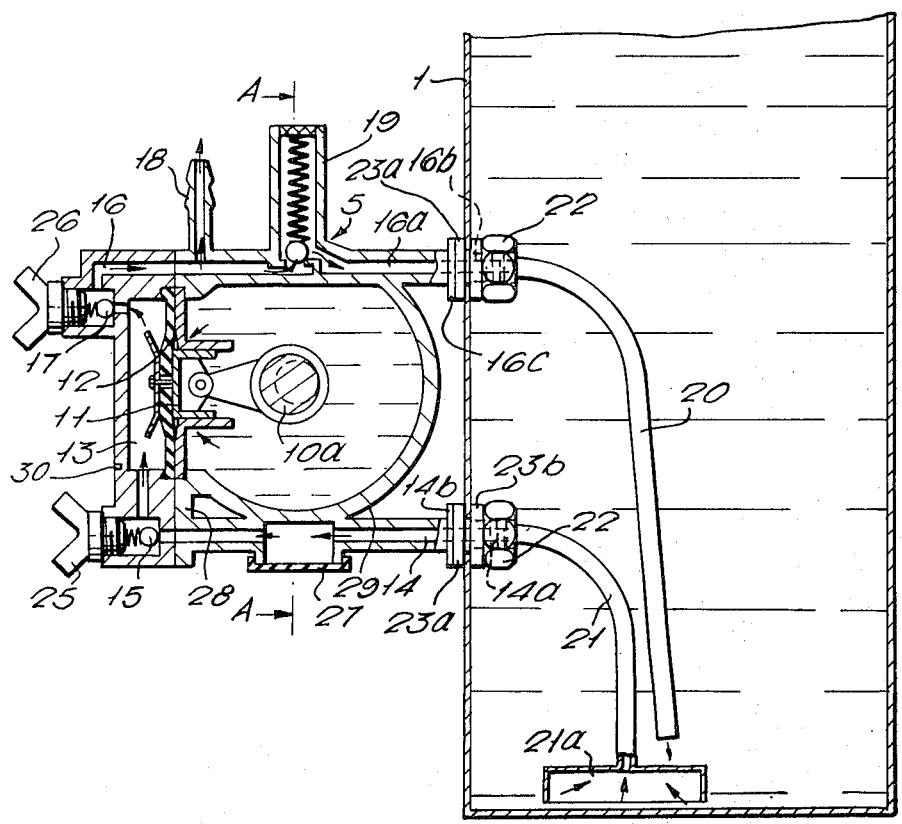
FIG. 3 is a vertical partial section of the motor-pump unit and of the container, said section being taken along the line B—B of FIG. 2.

It has to be noted that the valve seats for the valves 15 and 17 are made accessible from the outside by the provision of screw caps 25 and 26 and have been arranged at the rear part of the motor pump unit in order to make easier their overhaul. In the pipe 14 has been also provided a suction compensation chamber 27. It has to be pointed out that the work chamber 13 of the diaphragm pump 12 is defined by the rear wall of the pump casing 29 and by a removable head 30, where are also arranged the seats of the valves 15 and 17. Therefore, on account of the particular positioning of this head 30, this latter can be easily removed in order to perform inner overhaul operations on the pump unit. Upstream of the calibrated valve 19 is also branched off a conduit 31 (FIG. 2) ending into a chamber 32 which is separated in two parts by a flexible diaphragm 33 and which is designed to act as a hung controlled by a control valve 34. The engine unit which is placed on the opposite side is provided with a casing 35 which is not shown in FIG. 1 as well as with a flywheel 9. Said engine unit forms a compact group of conventional members and devices which are so positioned and arranged as to be accessible from the rear part of the knapsack spraying pump. At 36 is marked the ignition spark plug, while 37 is the silencer, 38 is the carburettor, 39 is the speed governor, preferably of pneumatic type, 40 is the air filter and 41 is the magneto, whose inductor is housed within the flywheel 9.

I claim: suspended

1. A spraying machine to be carried by the user, comprising a container for the liquid to be sprayed, means permitting the container to be sudpended from the user's shoulders, a motor, means mounting said motor to the side of said container located away from the user's back including vibration damper means interposed between said container and said motor, a pump, means mounting said pump to said container adjacent said motor comprising first and second fluid conduits exposed to the interior of said container, a third fluid conduit connecting said first fluid conduit to said inlet of said pump, a fourth fluid conduit connecting the outlet of said pump to said second fluid conduit, a flexible delivery hose connected to said fourth fluid conduit and provided with means for regulating the flow of liquid therefrom, and means within said fourth fluid conduit permitting the liquid therein to bypass said delivery hose and be conducted to said second fluid conduit at a predetermined pressure.

2. A spraying machine as in claim 1, wherein said motor is a single cylinder internal combustion engine provided with a crank shaft and said pump is provided with a housing within which is located a flexible diaphragm and a shaft, said crank shaft of said motor and said shaft of said pump being coaxial.

3. A spraying machine as in claim 2, wherein said pump further includes an eccentric operatively connected to a readial piston which actuates said flexible diaphragm of said pump.

4. A spraying machine as in claim 3, including a check valve located within said third fluid conduit and interposed between said container and said chamber of said pump within which said flexible diaphragm is located.

5. A spraying machine as in claim 4, including a check valve located within said fourth fluid chamber and interposed between said chamber within which said flexible diaphragm is located and said flexible delivery hose.

6. A spraying machine as in claim 5, wherein said delivery hose is positioned to extend generally vertically upward from said pump.

* * * * *